Patented Aug. 20, 1946

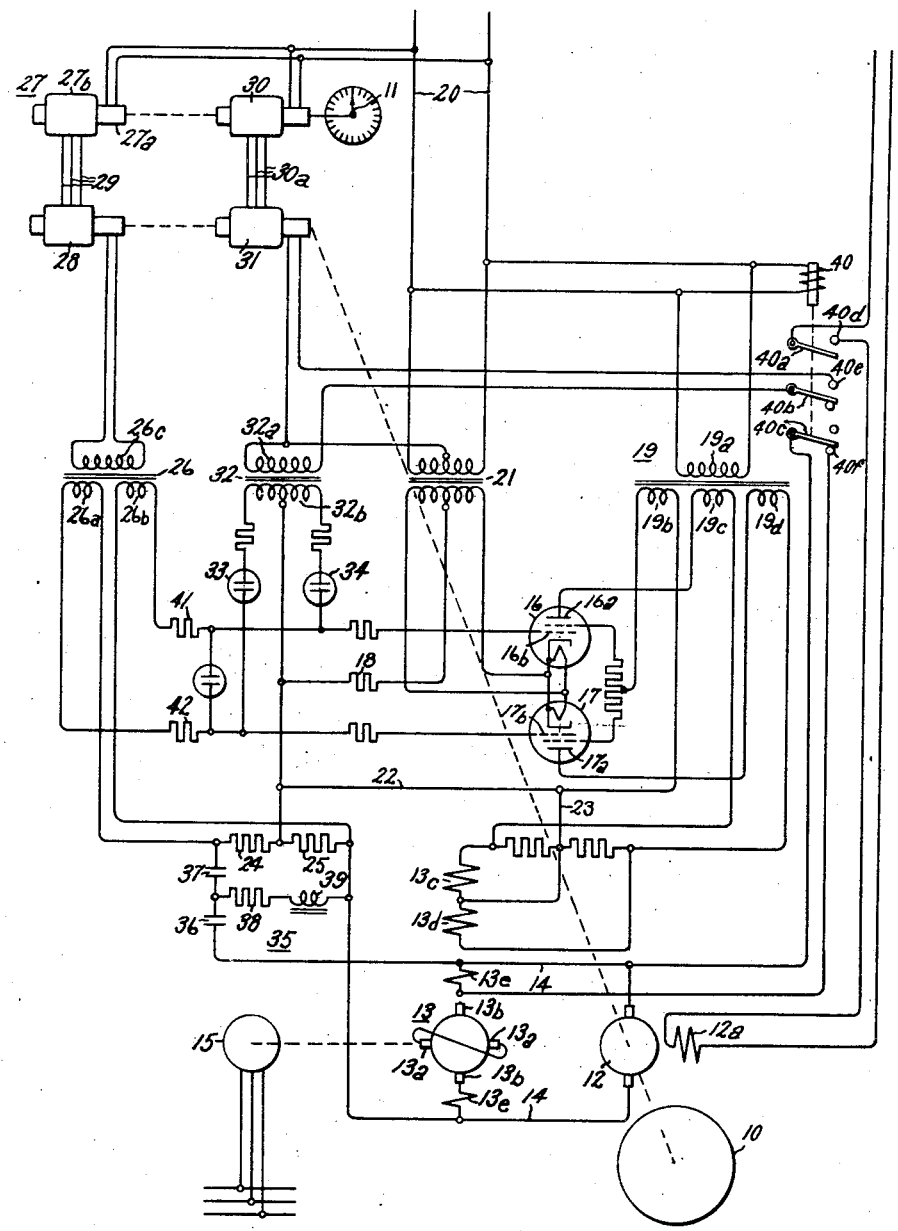

2,406,143

UNITED STATES PATENT OFFICE 2,406,143

FOLLOW-UP CONTROL SYSTEM

Sidney Godet, Schenectady, N. Y., assignor to General Electric Company, a corporation of New York Application June 5, 1942, Serial No. 445,949

3 Claims. (Cl. 172—239)

This invention relates to control systems, more particularly to follow-up control systems for driving an object into positional agreement with a pilot device, and it has for an object the provision of a simple, reliable and improved control system of this character.

A further and more specific object of the invention is the provision of improved means for preventing hunting or oscillation of the driven object about the position of correspondence with the pilot device.

In carrying the invention into effect in one form thereof, means responsive to positional disagreement of the pilot device and driven object are provided for producing a signal voltage corresponding to the error or positional disagreement of the pilot device and driven object. This signal voltage is amplified by suitable means such as an electric valve type amplifier, and the amplified signal voltage is used to control the supply of voltage to the follow-up motor so as to cause the motor to drive the object toward correspondence with the pilot device. If the driven object possesses a substantial amount of inertia or if the system is designed for a high degree of accuracy of correspondence, violent hunting or oscillation of the driven object with respect to the position of correspondence will result unless special means are provided for counteracting the tendency of the system to oscillate. For the purpose of preventing hunting, the frequency of oscillatory motion which is applied to the pilot device is not permitted to exceed a certain arbitrarily chosen value which is substantially less than the natural period of oscillation of the system itself. In addition, connections are provided between the follow-up motor and the input circuit of the electric valve amplifier and a high pass filter, constituting an anti-hunt network, is included in these connections. This filter has a cutoff frequency above the maximum frequency of oscillatory movement of the pilot device under normal conditions but below the natural frequency of oscillation of the follow-up system itself. Thus when a tendency of instability of the system is present, the oscillating component is strongly set back into the amplifier in such phase as to counteract the oscillation.

For a better and more complete understanding of the invention, reference should now be had to the following specification and to the accompanying drawing, the single figure of which is a simple, diagrammatical illustration of an embodiment of the invention.

Referring now to the drawing, an object 10 is to be driven into positional agreement with a pilot device or director 11 by suitable driving means such, for example, as represented by the direct current motor 12 to the drive shaft of which the object 10 is connected by means of suitable reduction gearing (not shown). Direct current is supplied to the armature of the motor 12 by means of a special generator 13 having a pair of short-circuited armature brushes 13a and a pair of load brushes 13b to which the armature of the motor 12 is connected by means of conductors 14. The generator 13 is an armature reaction excited dynamoelectric machine and is driven at a speed, which is preferably substantially constant, by any suitable driving means, such, for example, as an induction motor 15. The axis of the magnetic flux which is produced by the short-circuited armature brushes 13a is referred to as the short circuit axis, and the axis which is displaced 90 electrical degrees from the short circuit axis is referred to as the control axis. The net flux along the control axis is produced by two opposing control field windings 13c and 13d, a series compensating field winding 13e, and the armature reaction of the load current itself. The flux along the short circuit axis of machine 13 is produced by the armature reaction of the short circuit current, and if it is desired to limit the short circuit current to a low value, a portion of the flux along the short circuit axis may be produced by means of a shunt field winding (not shown). This short circuit axis flux generates the voltage which appears across the load brushes 13b, and the control axis flux produces the voltage which appears across the short-circuited brushes 13a and causes short circuit current to flow.

The compensating field winding 13e is so designed and connected that it neutralizes the armature reaction produced by the load current substantially 100 per cent. Consequently, the main control field windings 13c and 13d are only required to produce the amount of flux necessary to cause current to flow in the short circuit. Since the resistance of the short circuit is so low as to be almost negligible, the control field windings 13c and 13d are only required to produce a very small flux in order to produce a large current in the short circuit and a correspondingly large armature flux. Furthermore, since the flux of the control field winding need only build up to such a low value, and since the reactance of the short-circuited armature is very low, full load current in the short circuit axis will be obtained in an exceptionally short time. The important characteristics of this armature reaction excited machine 13 are its exceptionally high speed of response, and its extremely high amplification factor, i. e., the ratio between the magnitude of the current flowing in the control field winding 13c or 13d and the magnitude of the current which flows in the output circuit of the machine.

The control field windings 13c and 13d on the control axis of the armature reaction generator 13 are connected in the cathode-anode circuit of electric valves 16 and 17 which constitute a single-stage amplifier. Although electric valves 16 and 17 may be of any suitable type, they are preferably screen grid transmitter type quick heating tubes connected for duplex operation, and provided with a self-biasing resistor 18. Fixed voltages are applied to the screens and anodes of valves 16 and 17 by means of a transformer 19 having a primary winding 19a and a plurality of secondary windings 19b, 19c and 19d. As shown, the primary winding 19a is supplied from a suitable source of alternating voltage which is indicated in the drawing by the two supply lines 20. The cathode-anode circuits of valves 16 and 17 are traced from the midpoint of the secondary winding of the filament transformer 21 through the self-biasing resistor 18 and conductors 22 and 23 to the junction point of the control field windings 13c and 13d and thence through these two field windings in parallel and the secondary windings 19c and 19d of anode transformer 19 to the anodes 16a and 17a of valves 16 and 17. The cathode grid circuits of valves 16 and 17 are traced from the midpoint of the secondary winding of the filament transformer 21 through the self-biasing resistor 18, resistors 24 and 25 in parallel, the secondary windings 26a and 26b of grid transformer 26 to the control grids 16b and 17b. The voltages of the grids 16b and 17b, respectively, as a result of the inclusion of the biasing resistor 18 in the anode-cathode circuits of valves 16 and 17 are such that both valves 16 and 17 normally conduct equal amounts of current. This condition of equal conduction in both valves 16 and 17 occurs when the follow-up system is in correspondence, i. e., when the driven object 10 is in positional agreement with the pilot device 11. The currents conducted by the valves 16 and 17 excite the control field windings 13c and 13d of the armature reaction excited generator 13. However, since the control field windings 13c and 13d act in opposition to each other, the net exciting flux along the control axis of the generator 13 is zero and therefore the voltage at the load brushes 13b is zero.

In order to vary the bias voltages of the grids 16b and 17b, a component voltage of variable magnitude is supplied to the grid circuit substantially in phase with the anode voltage through the transformer 26, whose secondary windings 26a and 26b are connected in the cathode grid circuits of the valves 16 and 17, as explained in the foregoing, and whose primary winding 26c is connected to the single phase alternating current source 20 through rotary induction apparatus illustrated as comprising a rotary induction device 27 referred to as the transmitter and a similar rotary induction device 28 referred to as the receiver regulator. The rotary induction device 27 comprises a rotor member 27a provided with a single phase primary winding (not shown) and a stator member 27b provided with a distributed three-element winding (not shown) which is physically similar to the polyphase winding of an ordinary wound rotor induction motor. The stator and rotor windings are arranged in inductive relationship with each other so that the alternating magnetic field produced by the current flowing in the primary winding induces voltages in the elements of the secondary winding. The receiver regulator 28 is in all respects identical with the transmitter 27 and the terminals of its stator winding are connected to the terminals of the stator winding of the transmitter by means of conductors 29 so that the voltages induced in the stator winding of the transmitter cause currents to flow in the stator winding of the receiver regulator, thereby producing a magnetic field similar to the magnetic field produced by the current flowing in the rotor winding of the transmitter.

The rotor of the transmitter 27 is mechanically connected through suitable gearing (not shown) to the movable element of the pilot device 11. For the purpose of increasing the accuracy and sensitivity of the control, the ratio of this gearing between the pilot device and the rotor of the transmitter can be made as large as is desired, for example, the ratio may be as great as 72:1, i. e., for each degree that the pilot device is rotated, the rotor of the transmitter is rotated 72 degrees. The rotor of the receiver regulator 28 is connected either to the shaft of the motor 12 or to the shaft of the driven object 10 by means of suitable gearing (not shown) having the same ratio as the gearing between the pilot device and the transmitter.

The initial relative arrangement of the rotors of the transmitter 27 and receiver regulator 28 is such that when the system is in correspondence, the axis of the rotor winding of the receiver 28 is at right angles to the axis of the magnetic fields produced by the currents flowing in the stator winding so that the voltage induced in the rotor winding is zero. Rotation of the rotor member of the transmitter causes a voltage to be induced in the rotor winding of the receiver owing to the shift in the position of the axis of the magnetic field of the receiver relative to the axis of the coil of the rotor member, and the magnitude of this induced voltage depends upon the relationship of the axis of this winding to the axis of the magnetic field, e. g. when the axes of the magnetic field and of the rotor winding are parallel, the induced voltage is maximum, whereas when these axes are at right angles with each other, the induced voltage is zero. It will therefore be clear that rotation of the rotor of the transmitter or of the receiver regulator will vary the magnitude of the component voltage supplied to the grid circuit of the electric valves 16 and 17 which, in turn, will result in variation in the relationship of the current flowing in the anode-cathode circuits of these valves. The connections between the control grids 16b and 17b are such that when the voltage applied to one of the grids is increased, the voltage applied to the other grid is simultaneously decreased and consequently when the current supplied to one of the control field windings of the generator 13 is increased, the current supplied to the other is correspondingly decreased. The large gear ratios between the transmitter 27 and pilot device 11 and between the receiver 28 and driven object 10 provide a very fine and a very accurate control. If the ratio is 72:1 as assumed, then for each five degrees of rotation of the pilot device, the rotor of the transmitter 27 is rotated 360 degrees. However, since the axes of the rotor winding of the receiver 28 and the magnetic field of the stator are parallel at two points in each complete revolution of the transmitter, i. e., at zero degrees revolution and at 180 degrees revolution of the transmitter, it will be clear that the pilot device and the driven object must not be allowed to become more than 2½ degrees out of correspondence with each other, while under the control of the high speed fine control system, because when this amount of positional disagreement occurs, the same relationship exists between the rotors of the transmitter and the receiver as exists when the pilot device and driven object are in correspondence with each other. Under actual operating conditions, the rotor of the transmitter often does become more than 2½ degrees out of correspondence with the driven object, and a coarser system is therefore provided for taking over the control from the high speed fine control system before this amount of positional disagreement is exceeded. This coarse system is illustrated as comprising a transmitter 30 that is identical with the transmitter 27 and a receiver regulator 31 that is identical with the receiver regulator 28. The single phase rotor winding of the transmitter 30 is connected to the alternating voltage source 20, and the single phase rotor winding of the receiver regulator 31 is connected to the terminals of the primary winding 32a of the transformer 32, the terminals of the secondary winding 32b of which are connected to the grids 16b and 17b through electric valves 33 and 34. The midpoint of this secondary winding 32b is connected to the junction point of the resistors 24 and 25. The stator windings of the transmitter 30 and the receiver regulator 31 are connected to each other by means of conductors 30a.

The rotor of the transmitter 30 is directly connected to the rotatable member of the pilot device 11 by means of suitable gearing having a ratio such, for example, as 2:1, and the rotor member of the receiver regulator 31 is connected through suitable gearing (not shown) having a similar ratio, to the driven object 10. Thus it will be seen that the transmitter 30 and the receiver regulator 31 constitute a low speed system and provide the desired coarse control.

The electric valves 33 and 34 may be of any suitable type but are preferably of the two-electrode type into the envelopes of which a small quantity of an inert gas such, for example, as neon is introduced. A characteristic of a valve of this character is that when a voltage of less than a predetermined value is applied to its terminals, the valve does not conduct current and that when this voltage is exceeded, the neon gas becomes ionized and the valve becomes conducting.

The transformer 32 preferably has a very high step-up ratio of the order of 50:1, so that when the positional disagreement of the pilot device and driven object is less than a predetermined amount, e. g. 2½ degrees or less, the voltage applied to valves 33 and 34 is less than the ionization or breakdown voltage of these valves, but equals or exceeds the ionization voltage when the positional disagreement equals or exceeds this predetermined amount. Thus, when the positional disagreement is less than this predetermined amount, the control connections between the coarse control system and the grids of valves 16 and 17 are interrupted and the coarse control system is ineffective, and when the disagreement equals or exceeds this amount, the valves become conducting and the voltage induced in the secondary winding of the transformer 32 is applied to the control grids 16b and 17b and is thereafter effective in controlling the valves 16 and 17.

For the purpose of preventing hunting in the operation of the system, an antihunting network 35 is provided. This antihunt network is included in the connecting lines between the follow-up motor 12 and the grid or input circuit of the electric valves 16 and 17 and it comprises the capacitor elements 36 and 37, the resistor element 38, and inductance element 39, and resistor elements 24 and 25. The capacitor elements 36 and 37 are connected in series in the connecting lines between the armature terminals of motor 12 and the input circuit of valves 16 and 17, and resistor 38 and inductance 39 are connected in series with each other across the connecting lines. Similarly, the resistors 24 and 25 are connected in series with each other across the connecting lines. The antihunt network operates as a high pass filter having a cutoff frequency that is greater than $f_a$ which is the highest frequency of any oscillatory component of motion of the pilot device 11 so that the output of the antihunt network is minimum in the region of $f_a$. The antihunt network is designed to have a maximum output in the region of $f_b$ which is the natural frequency of oscillation of the system.

The system is designed so that $f_b$ is several times as great as $f_a$. The connections from the antihunt network to the follow-up motor 12 and from the antihunt network to the input circuit of the electric valves are such that the voltage fed from the network to the input circuit is 180 degrees out of phase with any oscillation or incipient oscillation of the load 10 with respect to the position of correspondence. In addition, the design of the antihunt network is such as to pass substantially zero out of phase components. In other words, the network is not sharply tuned to any frequency less than $f_b$.

The foregoing desired characteristics of the antihunt network may be obtained by designing the network so that the elements thereof have the following values:

(1) $$C_{36} = \frac{300,000}{f_b^2 L}$$

(2) $$C_{37} = \frac{2000\sqrt{LC_{36}}}{R_{24-25}}$$

in which,

L is the inductance of coil 39 in henries,
$C_{36}$ is the capacity of capacitor 36 in microfarads,
$C_{37}$ is the capacity of capacitor 37 in microfarads,
$R_{24-25}$ is the resistance of resistors 24 and 25 in ohms,
$f_b$ is the natural frequency of oscillation of the system in cycles per second,
$f_a$ is the highest frequency of any oscillating component of motion of the pilot device.

The value L of inductance coil 39 may be arbitrarily chosen and the resistance of resistor 38 may best be determined empirically after the values L, $C_{36}$ and $C_{37}$ have been determined. The resistance of resistors 24 and 25 and the inductance of coil 39 should be as large as is convenient in order that the capacitors 36 and 37 may be of reasonable size.

With the foregoing understanding of the elements and their organization in the completed system, the operation of the system itself will readily be understood from the following detailed description. Since the operating coil of the relay 40 is connected across the source 20, the relay picks up and its movable contacts 40a and 40b engage the stationary contacts 40d and 40e, respectively. Contacts 40a and 40d in closing complete an energizing circuit for the field winding 12a of the follow-up motor, and contacts 40b and 40e in closing remove a short circuit about a portion of the compensating field winding 13e of the armature reaction excited generator 13.

Assuming that the pilot device 11 and the driven object 10 are in positional agreement, the system is in its normal deenergized condition in which it is illustrated. As previously pointed out, when in this condition, both valves 16 and 17 are conducting equal amounts of current so that the opposing control field windings 13c and 13d of generator 13 are equally excited and the output voltage of the generator 13 is zero. Manual or power driven rotation of the pilot device 11 effects a corresponding but multiplied rotation of the rotor of transmitter 27, causing a rotation of the magnetic field of the stator of receiver regulator 28 so that a voltage is induced in the rotor winding of the receiver regulator proportional to the amount of rotation of the pilot device 11. This induced voltage is applied to the grid circuits of electric valves 16 and 17 and results in increasing the current flowing in one of the valves and decreasing the current flowing in the other valve. Assuming that the direction of rotation of the pilot device is such as to increase the current flowing in the valve 16 and to decrease the current flowing through the valve 17, the excitation of control field winding 13c will be increased and the excitation of control field winding 13d will be decreased. The difference in excitations of the two opposing field windings 13c and 13d produces a net excitation along the control axis of the generator 13, and as a result, the generator 13 supplies current to the armature of the follow-up motor 12 in such a direction that the motor is caused to rotate in a direction to drive the object 10 toward correspondence with the pilot device 11.

If the driven object 10 can not follow the rapid movement of the pilot device 11 so that the positional disagreement of the driven object and pilot device equals or exceeds the predetermined amount, the voltage induced in the secondary winding of the transformer 32 becomes so great that the voltages across electric valves 33 and 34 exceed the ionization voltages of these valves and cause them to become conducting. Voltages continue to be induced in the secondary windings 26a and 26b of the transformer 26 after the electric valves 33 and 34 have become conducting, but owing to the high resistance of resistors 41 and 42, the voltages induced in the secondary windings 26a and 26b are no longer effective and the electric valves 16 and 17 are controlled solely by the voltage induced in the secondary winding 32b of transformer 32. Thus when the electric valves 33 and 34 become conducting, the control connections between the low speed coarse control system and the electric valves 16 and 17 are completed and the control of the follow-up system is effectively transferred from the high speed fine control system to the low speed coarse control system. As a result, a voltage is applied to the input circuit of electric valves 16 and 17 of such magnitude that the current supplied by armature reaction excited generator 13 to the follow-up motor 12 causes the latter to drive the driven object 10 at maximum speed in the same direction as that in which the pilot device 11 is moving.

Had the departure from correspondence been in the opposite direction, the operation of each of the elements would be similar but opposite to that of the operations thus far described with the result that the motor 12 would have driven the driven object in the reverse direction.

Whenever the positional disagreement of the pilot device and driven object becomes less than the predetermined amount at which the valves 33 and 34 become ionized, the voltages applied to the valves 33 and 34 will become less than the ionization voltage of these valves, and the valves will accordingly become non-conducting. The result of this is to interrupt the control connections between the low speed coarse control system and the input circuit of the valves 16 and 17, thereby to render the low speed coarse control system ineffective and to re-transfer the control to the high speed fine control system.

As previously pointed out, the operation of the system as described in the foregoing is modified during acceleration and deceleration by the action of the antihunt network. Whenever there exists a tendency of the system to oscillate as usually occurs during acceleration or deceleration, an oscillating component of voltage derived from the follow-up motor 12 is very strongly fed back through the antihunt network 35 to the input circuit of the amplifier valves 16 and 17 in such a phase as to counteract the oscillation. In other words, for rapid changes of velocity having an oscillating component of motion, a high feedback exists, while for constant velocity no feedback exists.

Although in accordance with the provisions of the patent statutes this invention has been explained as being embodied in concrete form and the principle thereof explained, together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States is:

1. A follow-up control system comprising in combination, a pilot device, a driven object, an electric motor for driving said object, means responsive to disagreement of said pilot device and driven object for producing a signal voltage corresponding to said positional disagreement, amplifier means responsive to said signal voltage for supplying a voltage to said motor to cause said motor to drive said object toward correspondence with said pilot device, an antihunt means comprising a high pass filter having a cutoff frequency substantially lower than the frequency of the natural period of oscillation of said system and connected between the armature terminals of said motor and the input to said amplifier.

2. A remote follow-up control system for a pilot device and driven object in which the frequency of oscillatory movement of the pilot device is substantially less than the natural frequency of oscillation of said system comprising in combination, an electric motor for driving said object, an electric valve type amplifier provided with an input circuit and with an output circuit operatively associated with said motor, means responsive to positional disagreement of said pilot device and driven object for supplying a signal voltage to said input circuit corresponding to said positional disagreement thereby to control the voltage supplied to said motor to cause said motor to drive said object toward correspondence with said pilot device, and antihunt means responsive to the terminal voltage of said motor for supplying a feedback voltage to said input circuit comprising a high pass filter having a cutoff frequency intermediate said frequency of movement of said pilot device and said natural frequency of said system.

3. In a follow-up control system for causing a driven object to follow the movements of a pilot device and in which the frequency of oscillatory movement of said pilot device is substantially less than the natural period of oscillation $f_b$ of said system, an electric motor for driving said object, an electric valve type amplifier provided with an output circuit operatively connected to said motor and with an input circuit, means responsive to positional disagreement of said pilot device and driven object for supplying a signal voltage to said input circuit corresponding to said positional disagreement thereby to control the voltage supplied to said motor, and antihunt means comprising means for deriving a voltage from said motor, and a high pass filter connected between said voltage deriving means and said input circuit and comprising a connecting line having lumped resistance $R_1$ and lumped impedance $L$ connected in series with each other and in shunt across said line, and a first lumped capacitance $C_1$ in series with said connecting line substantially equal to $$\frac{300,000}{L(f_b)^2}$$

and a second lumped resistance $R_2$ in shunt across said connecting line and a second lumped capacitance $C_2$ in series with said connecting line and equal substantially to $$\frac{2000\sqrt{LC_1}}{R_2}$$

SIDNEY GODET.